US008370239B2

(12) United States Patent  (10) Patent No.: US 8,370,239 B2
Graboske et al.  (45) Date of Patent: \*Feb. 5, 2013

(54) METHOD AND APPARATUS FOR TESTING AUTOMATED VALUATION MODELS

(75) Inventors: Benjamin Graboske, Trabuco Canyon, CA (US); Robert L. Walker, Tustin, CA (US)

(73) Assignee: Corelogic Solutions, LLC, Irvine, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/182,289

(22) Filed: Jul. 13, 2011

(65) Prior Publication Data

US 2012/0011075 A1 Jan. 12, 2012

Related U.S. Application Data

(62) Division of application No. 11/007,750, filed on Dec. 8, 2004, now Pat. No. 8,001,024.

(51) Int. Cl.
*G06Q 40/00* (2012.01)

(52) U.S. Cl. ............................. 705/35; 705/1.1; 705/313

(58) Field of Classification Search ...................... 705/35
See application file for complete search history.

(56) References Cited

U.S. PATENT DOCUMENTS

| | | | |
|---|---|---|---|
| 6,609,118 B1 | 8/2003 | Khedkar et al. | |
| 6,873,972 B1 | 3/2005 | Marcial et al. | |
| 7,127,439 B2 | 10/2006 | Jannarone et al. | |
| 8,001,024 B2 | 8/2011 | Graboske et al. | |
| 2001/0039506 A1 | 11/2001 | Robbins | |
| 2002/0007336 A1 | 1/2002 | Robbins | |
| 2002/0049653 A1 | 4/2002 | Johnson et al. | |
| 2002/0127529 A1* | 9/2002 | Cassuto et al. | 434/335 |
| 2003/0212565 A1 | 11/2003 | Badali et al. | |
| 2003/0212678 A1 | 11/2003 | Bloom et al. | |
| 2005/0171822 A1 | 8/2005 | Cagan | |
| 2006/0015357 A1* | 1/2006 | Cagan | 705/1 |
| 2006/0085234 A1 | 4/2006 | Cagan | |

OTHER PUBLICATIONS

Calhoun, Charles A. "Property Valuation Methods and Data in the United States," Housing Finance International, (Dec. 2001), p. 12-23.*
Ferris, F. "Managing the Collateral Risk," Mortgage Technology, (Nov./Dec. 2003), p. 26-30.*
Kane, M. Steven, Mark R. Linne, Jeffrey A. Johnson. "Evaluating the Valuers," The Appraisal Journal, (Spring 2004), p. 147-154.*
"Standard on Automated Valuation Models (AVMs)," Assessment Journal, (Fall 2003), p. 109.*
Visit Limsombunchai, "House Price Prediction: Hedonic Price Model vs. Artificial Neural Network", 2004 New Zealand Agricultural and Resource Economics Society Conference, Jun. 2004, in 15 pages.

* cited by examiner

*Primary Examiner* — Elizabeth Rosen
(74) *Attorney, Agent, or Firm* — Knobbe, Martens, Olson & Bear, LLP (57) ABSTRACT

A method and apparatus for real time testing of automated valuation using various indicators of accuracy. These indicators are then weighted according to their value as indicators of accuracy using individualized weighting factors or an equation. A ranking is then computed based upon the factors and their weights. This method is preformed continuously, so as to achieve real-time or periodically updated automated valuation model accuracy rankings.

21 Claims, 9 Drawing Sheets

| PRIMARY RANKING | | | | | | |
|---|---|---|---|---|---|---|
| | RANK | AVM X FLORIDA | RANK | AVM Y FLORIDA | RANK | AVM Z FLORIDA |
| HIT RATE PERCENTAGE | 1 | 93.6% | 2 | 85.1% | 3 | 67.8% |
| MEDIAN ERROR | 3 | 7.3% | 1 | 5.5% | 2 | 6.7% |
| ABSOLUTE MEAN ERROR | 3 | 5.4% | 1 | 4.5% | 2 | 4.9% |
| MEAN SQUARED ERROR | 3 | 0.3% | 1 | 0.2% | 2 | 0.2% |
| AVM ACCURACY | 3 | 49.2% | 1 | 53.4% | 2 | 50.5% |
| OUTLIER PERCENTAGE | 1 | 12.7% | 2 | 15.1% | 3 | 15.3% |
| SCORE | 23 | | 13.5 | | 23.5 | |
| | RANK | AVM X CALIFORNIA | RANK | AVM Y CALIFORNIA | RANK | AVM Z CALIFORNIA |
| HIT RATE PERCENTAGE | 2 | 95.0% | 1 | 95.1% | 3 | 81.1% |
| MEDIAN ERROR | 3 | 9.2% | 1 | 6.0% | 2 | 7.6% |
| ABSOLUTE MEAN ERROR | 3 | 7.5% | 1 | 4.0% | 2 | 5.9% |
| MEAN SQUARED ERROR | 3 | 0.6% | 1 | 0.2% | 2 | 0.3% |
| AVM ACCURACY | 3 | 46.9% | 1 | 56.6% | 2 | 49.1% |
| OUTLIER PERCENTAGE | 2 | 11.8% | 1 | 10.8% | 3 | 13.6% |
| SCORE | 26.5 | | 10 | | 23.5 | |
| | | AVM X NEW JERSEY | | AVM Y NEW JERSEY | | AVM Z NEW JERSEY |
| HIT RATE PERCENTAGE | 2 | 88.4% | 1 | 92.2% | 3 | 79.9% |
| MEDIAN ERROR | 2 | 4.8% | 1 | 2.1% | 3 | 5.5% |
| ABSOLUTE MEAN ERROR | 2 | 1.7% | 1 | 1.0% | 3 | 3.6% |
| MEAN SQUARED ERROR | 1 | 0.0% | 1 | 0.0% | 3 | 0.1% |
| AVM ACCURACY | 2 | 48.9% | 1 | 55.4% | 3 | 47.2% |
| OUTLIER PERCENTAGE | 2 | 16.8% | 1 | 16.3% | 3 | 22.9% |
| SCORE | 19 | | 10 | | 30 | |

Fig. 5a.

| SECONDARY RANKING | RANK | AVM X FLORIDA | RANK | AVM Z FLORIDA |
|---|---|---|---|---|
| HIT RATE PERCENTAGE | 1 | 70.3% | 2 | 4.1% |
| MEDIAN ERROR | 1 | 9.8% | 2 | 23.7% |
| ABSOLUTE MEAN ERROR | 1 | 7.7% | 2 | 20.0% |
| MEAN SQUARED ERROR | 1 | 0.6% | 2 | 4.0% |
| AVM ACCURACY | 1 | 57.1% | 2 | 27.6% |
| OUTLIER PERCENTAGE | 1 | 23.8% | 2 | 58.6% |
| SCORE | 10 | | 20 | |
| | | AVM X CALIFORNIA | | AVM Z CALIFORNIA |
| HIT RATE PERCENTAGE | 1 | 92.0% | 2 | 3.0% |
| MEDIAN ERROR | 1 | 14.6% | 2 | 26.7% |
| ABSOLUTE MEAN ERROR | 2 | 13.7% | 1 | 13.4% |
| MEAN SQUARED ERROR | 2 | 1.9% | 1 | 1.8% |
| AVM ACCURACY | 1 | 33.2% | 2 | 11.1% |
| OUTLIER PERCENTAGE | 1 | 22.4% | 2 | 77.8% |
| SCORE | 12 | | 18 | |
| | | AVM X NEW JERSEY | | AVM Z NEW JERSEY |
| HIT RATE PERCENTAGE | 1 | 66.3% | 2 | 6.2% |
| MEDIAN ERROR | 1 | 6.1% | 2 | 27.6% |
| ABSOLUTE MEAN ERROR | 1 | 2.9% | 2 | 23.3% |
| MEAN SQUARED ERROR | 1 | 0.1% | 2 | 5.4% |
| AVM ACCURACY | 1 | 32.9% | 2 | 13.3% |
| OUTLIER PERCENTAGE | 1 | 32.3% | 2 | 66.7% |
| SCORE | 10 | | 20 | |

PRIMARY WEIGHTED RANKING

| AUTOMATED VALUATION MODEL | SCORE | RANK |
|---|---|---|
| FLORIDA RANKING | | |
| AVM Y | 13.5 | 1 |
| AVM X | 23 | 2 |
| AVM Z | 23.5 | 3 |
| CALIFORNIA RANKING | | |
| AVM Y | 10 | 1 |
| AVM Z | 23.5 | 2 |
| AVM X | 26.5 | 3 |
| NEW JERSEY RANKING | | |
| AVM Y | 10 | 1 |
| AVM X | 19 | 2 |
| AVM Z | 30 | 3 |
| OVERALL RANKING | | |
| AVM Y | 33.5 | 1 |
| AVM X | 66.5 | 2 |
| AVM Z | 77 | 3 |

Fig. 6b.

SECONDARY WEIGHTED RANKING

| AUTOMATED VALUATION MODEL | SCORE | RANK |
|---|---|---|
| FLORIDA RANKING | | |
| AVM X | 10 | 1 |
| AVM Z | 20 | 2 |
| CALIFORNIA RANKING | | |
| AVM X | 12 | 1 |
| AVM Z | 18 | 2 |
| NEW JERSEY RANKING | | |
| AVM X | 10 | 1 |
| AVM Z | 20 | 2 |
| OVERALL RANKING | | |
| AVM X | 32 | 1 |
| AVM Z | 58 | 2 |

Fig. 7a.

PRIMARY RANKING

| | AVM X FLORIDA | AVM Y FLORIDA | AVM Z FLORIDA |
|---|---|---|---|
| HIT RATE PERCENTAGE | 93.6% | 85.1% | 67.8% |
| MEDIAN ERROR | 7.3% | 5.5% | 6.7% |
| ABSOLUTE MEAN ERROR | 5.4% | 4.5% | 4.9% |
| MEAN SQUARED ERROR | 0.3% | 0.2% | 0.2% |
| AVM ACCURACY | 49.2% | 53.4% | 50.5% |
| OUTLIER PERCENTAGE | 12.7% | 15.1% | 15.3% |
| SCORE | 585 | 566 | 456 |

| | AVM X CALIFORNIA | AVM Y CALIFORNIA | AVM Z CALIFORNIA |
|---|---|---|---|
| HIT RATE PERCENTAGE | 95.0% | 95.1% | 81.1% |
| MEDIAN ERROR | 9.2% | 6.0% | 7.6% |
| ABSOLUTE MEAN ERROR | 7.5% | 4.0% | 5.9% |
| MEAN SQUARED ERROR | 0.6% | 0.2% | 0.3% |
| AVM ACCURACY | 46.9% | 56.6% | 49.1% |
| OUTLIER PERCENTAGE | 11.8% | 10.8% | 13.6% |
| SCORE | 564 | 654 | 514 |

| | AVM X NEW JERSEY | AVM Y NEW JERSEY | AVM Z NEW JERSEY |
|---|---|---|---|
| HIT RATE PERCENTAGE | 88.4% | 92.2% | 79.9% |
| MEDIAN ERROR | 4.8% | 2.1% | 5.5% |
| ABSOLUTE MEAN ERROR | 1.7% | 1.0% | 3.6% |
| MEAN SQUARED ERROR | 0.0% | 0.0% | 0.1% |
| AVM ACCURACY | 48.9% | 55.4% | 47.2% |
| OUTLIER PERCENTAGE | 16.8% | 16.3% | 22.9% |
| SCORE | 570 | 641 | 475 |

Fig. 7b.

SECONDARY RANKING

| | AVM X FLORIDA | AVM Z FLORIDA |
|---|---|---|
| HIT RATE PERCENTAGE | 70.3% | 4.1% |
| MEDIAN ERROR | 9.8% | 23.7% |
| ABSOLUTE MEAN ERROR | 7.7% | 20.0% |
| MEAN SQUARED ERROR | 0.6% | 4.0% |
| AVM ACCURACY | 57.1% | 27.6% |
| OUTLIER PERCENTAGE | 23.8% | 58.6% |
| SCORE | 427 | -373 |

| | AVM X CALIFORNIA | AVM Z CALIFORNIA |
|---|---|---|
| HIT RATE PERCENTAGE | 92.0% | 3.0% |
| MEDIAN ERROR | 14.6% | 26.7% |
| ABSOLUTE MEAN ERROR | 13.7% | 13.4% |
| MEAN SQUARED ERROR | 1.9% | 1.8% |
| AVM ACCURACY | 33.2% | 11.1% |
| OUTLIER PERCENTAGE | 22.4% | 77.8% |
| SCORE | 363 | -528 |

| | AVM X NEW JERSEY | AVM Z NEW JERSEY |
|---|---|---|
| HIT RATE PERCENTAGE | 66.3% | 6.2% |
| MEDIAN ERROR | 6.1% | 27.6% |
| ABSOLUTE MEAN ERROR | 2.9% | 23.3% |
| MEAN SQUARED ERROR | 0.1% | 5.4% |
| AVM ACCURACY | 32.9% | 13.3% |
| OUTLIER PERCENTAGE | 32.3% | 66.7% |
| SCORE | 289 | -518 |

Fig. 8a.

PRIMARY WEIGHTED RANKING

| AUTOMATED VALUATION MODEL | SCORE | RANK |
|---|---|---|
| FLORIDA RANKING | | |
| AVM X | 585 | 1 |
| AVM Y | 566 | 2 |
| AVM Z | 455 | 3 |
| CALIFORNIA RANKING | | |
| AVM Y | 654 | 1 |
| AVM X | 564 | 2 |
| AVM Z | 514 | 3 |
| NEW JERSEY RANKING | | |
| AVM Y | 641 | 1 |
| AVM X | 570 | 2 |
| AVM Z | 475 | 3 |
| OVERALL RANKING | | |
| AVM Y | 1861 | 1 |
| AVM X | 1719 | 2 |
| AVM Z | 1444 | 3 |

Fig. 8b.

SECONDARY WEIGHTED RANKING

| AUTOMATED VALUATION MODEL | SCORE | RANK |
|---|---|---|
| FLORIDA RANKING | | |
| AVM X | 427 | 1 |
| AVM Z | -373 | 2 |
| CALIFORNIA RANKING | | |
| AVM X | 363 | 1 |
| AVM Z | -528 | 2 |
| NEW JERSEY RANKING | | |
| AVM X | 289 | 1 |
| AVM Z | -518 | 2 |
| OVERALL RANKING | | |
| AVM X | 1079 | 1 |
| AVM Z | -1418 | 2 |

METHOD AND APPARATUS FOR TESTING AUTOMATED VALUATION MODELS

CROSS-REFERENCE TO RELATED APPLICATIONS

This application is a division of U.S. patent application Ser. No. 11/007,750, filed Dec. 8, 2004, titled "METHOD AND APPARATUS FOR TESTING AUTOMATED VALUATION MODELS," now U.S. Pat. No. 8,001,024, which is hereby incorporated by reference herein in its entirety.

BACKGROUND

1. Field of the Invention

The present invention relates to testing procedures to evaluation property valuations, and more specifically to a method of and apparatus for testing the accuracy of multiple automated valuation models.

2. Background of the Invention

Automated valuation models are increasingly being used in real estate as the first or sole indicator of property value. The valuations provided by these automated valuation models are of varying accuracy. Currently, there exists no standardized means by which to compare the accuracy of one automated valuation model to that of another. The "confidence scores" often included along with any automated valuation produced are only indicators of a particular automated valuation model's internal evaluation that its own valuation is more or less accurate and often bear no relation to the internal evaluations of other automated valuation model valuations.

Therefore, a means by which these automated valuation models' accuracy at providing valuations would prove very useful. Providing a means to gauge the accuracy of one automated valuation model against that of another enables the automated valuation consumer to choose the preferable automated valuation model on which to rely. Generally speaking, automated valuation models may be more or less accurate depending on the geographic area or price range of the property. Therefore, a means of testing the accuracy of automated valuation models that is capable of categorizing valuations by geographic area, economic tier, or property type would also be useful. There currently exists no empirically based ranking system for automated valuation model accuracy. Further, there currently exists no accurate and up-to-date data upon which to base such a ranking system.

It is therefore an object of this invention to provide a means by which automated valuation models may be compared against each other for accuracy. It is a further object of this invention to provide this means in particular sub-divisions such as geographic areas, price ranges, price tiers, and property types. It is a further object of this invention to provide a useful data set for comparing these automated valuation models and for evaluating the rankings computed using this method.

These and other objectives of the present invention will become apparent from the following description of the invention.

SUMMARY OF THE INVENTION

According to the present invention, a method and apparatus are described whereby an automated valuation model may be tested for accuracy. This method and apparatus further provides a means by which comparisons between various automated valuation models may be performed using standardized indications of accuracy. The method and apparatus of this invention also provides data from which any user of automated valuation model data may perform calculations and comparisons of whatever kind using standardized data.

In the preferred embodiment of the invention, the method begins with the receipt of new sales data on a property. However, data may be generated in several ways in alternative embodiments including appraisals, foreclosures, and even other automated valuations. Once this new data is generated, it is quickly passed on to the real time testing implementation to be described. This new data is inputted in real-time, as it is received, into a database. The data saved includes the property's sale (or other valuation) price and the property's geographic area.

Immediately, the real time testing implementation requests an automated valuation of the new data's subject property. This request is forwarded to each automated valuation model to which the particular real time testing implementation has access. Each automated valuation model then returns a valuation without reference to the current sale of that subject property. It is unlikely that an automated valuation model has been updated to take this new property sale, appraisal, or other valuation into account. This is due to the real time nature of the invention. Because automated valuation models are not updated in real time, it would be highly unlikely that any one automated valuation model would have already received and incorporated the new data that has just been received by the method of this invention.

Alternatively, an implementation of this invention may aggregate automated valuation model valuation requests until the end of a day or until the end of any other predetermined period of time. Then, the implementation of this invention requests a valuation for each property for which new sale or reference data was generated since the last request from each automated valuation model being ranked. The database of reference data and automated valuation model valuations is thereby continuously updated, but need not necessarily be in real time. This automated valuation model data will almost certainly not have been updated to include the new sales data because automated valuation models are usually only updated once a month or quarter. Whether valuation requests are done in real time (immediately upon receipt of new sale data) or shortly thereafter (at the end of a predetermined time period), the continuously updated database of automated valuations and of reference values provides a data set from which the data used to rank the accuracy of automated valuation models can be derived.

The database containing the sale price (or other new data) and each automated valuation model valuation of the subject property may then be used to create various indicators of the accuracy of each automated valuation model's property valuations. These indicators may be calculated for any geographic area, property type, economic tier, or any other characteristic of a property. In one embodiment of the invention, the data within the database is used to create several numerical indicators of the accuracy of an automated valuation model in a given geographic area. The automated valuation models are then ranked, using ordinal numbers, according to their accuracy. These numerical indicators are then weighed, depending upon their usefulness as indicators of overall accuracy. Alternative weightings may be given to particular indicators. In another embodiment, the weighting of the various indicators of accuracy may be done using an equation. Then, the rankings may be calculated based on price ranges or taking into account the cost to request each automated valuation model valuation, such that a ranking may be generated for the automated valuation model of the best accuracy for the cost or the automated valuation model that is best in a particular price range or geographic area. Additionally, secondary rankings may be made as to accuracy excluding data referenced by the primary (or most accurate) automated valuation model overall. Alternatively, the secondary rankings may be further subdivided to exclude only the data referenced by the primary (or most accurate) automated valuation model in a particular geographic area, economic tier or property type.

The rankings of accuracy in a particular geographic area, economic tier or property type may then be passed on to the users of automated valuations models. The rankings may be designed to cater to a particular client, incorporating other interests, such as least-expensive accurate automated valuation model. Additionally, the data itself indicating the accuracy of each automated valuation model may simply be passed directly, either in total or piecemeal, to a user of automated valuation models. This data may be used to perform whatever calculations the particular user desires in order to determine what automated valuation model is best for the particular user's needs. Alternatively, the data may be passed along to an automated valuation model user along with the ranking data as calculated in the preferred embodiment, such that the automated valuation model user may ensure the accuracy of the ranking database information and to perform their own calculations and weightings.

Further features and advantages of the present invention will be appreciated by reviewing the following drawings and detailed description of the invention.

BRIEF DESCRIPTION OF THE DRAWINGS

FIG. 6a is a table depicting a summary of the primary weighted rankings of several automated valuation models using the data obtained from the rankings show in FIG. 5a.

FIG. 8a is a table depicting a summary of the primary weighted rankings of several automated valuation models using the data obtained from the rankings shown in FIG. 7a.

DETAILED DESCRIPTION OF THE INVENTION

Figure 1:
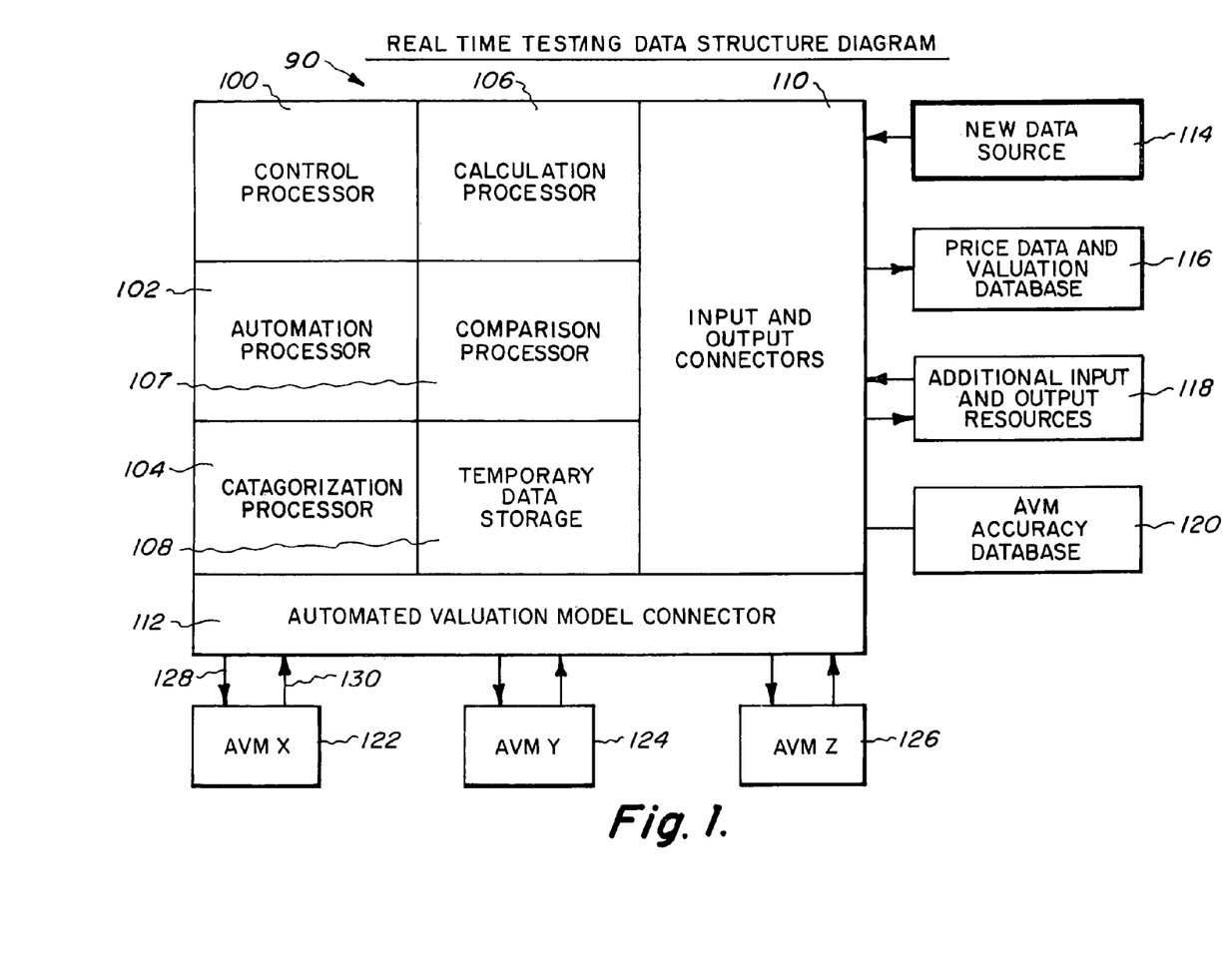
FIG. 1 is a data structure used to implement the method and apparatus of the invention.

The present invention provides a method of and apparatus for real time testing of automated valuation models ("AVMs" or singularly "AVM"). Referring first to FIG. 1, an example data structure for use in implementing this method is depicted. Depicted in element 90 is an example automated valuation model testing data structure ("data structure"). The elements in this example data structure 90 may be altered, and some may even be eliminated, without diminishing the scope of the invention. This data structure 90 is one means by which to implement the method of the invention. Many alternative embodiments of the present invention may be used which accomplish substantially the same result.

The following components each may be implemented in software, in hardware, or a combination of both, so long as the method of this invention is carried out by the particular implementation. The control processor 100 is used as an internal control mechanism. If implemented in software, for example, it is the main function of the program, used in calling each subsidiary function. If implemented in hardware, it is the chip in which each of the other functions is embodied. The automation processor 102 is used in automating the process by which the new sale data or other new data is incorporated into the real time testing database. It also automates the process by which automated valuation data is requested from each automated valuation model being tested and the process by which periodic calculations and rankings of the various automated valuation models are performed. The categorization processor 104 is used to categorize property according to its geographic area, economic tier or property type. Economic tier refers to a particular valuation range, price range, valuation tier or price tier of which a property may be a part. Tiers may be divided into quartiles, made up of upper tier, two middle tiers and a lower tier. Tiers may be calculated as a percentile of valuation or price in relation to other properties in a large or small geographic area or a property type. Economic tier may be determined using any price or valuation related data concerning a particular property that would allow categorization of a property with respect to another property.

Property type refers to a property type such as a single-family residence, condominium or any other means of categorizing properties. Alternatively, property type could also be a categorization based on the number of bedrooms and bathrooms in a particular property. Any method of grouping and differentiating properties based upon their individual characteristics could be considered a property type.

The calculation processor 106 is used to perform the calculations associated with deriving indicators of accuracy for each automated valuation model and it is also used in using those indicators and the various weighting factors to order the automated valuation models for ranking. The comparison processor 107 is used in comparing the reference values with the automated valuations. Temporary data storage 108 is used to temporarily store data as it is being used. In a standard personal computer, temporary data storage is random, access memory (RAM). It is used to store temporary data, such as partial calculations of the indicators of accuracy or ranking data before it is stored into the AVM accuracy database 120. The input and output connectors 110 are used as a buffer between the data 90 and external data and output sources such as the new data source 114.

The input and output connectors use standard communications protocols when able to do so and use proprietary communications protocols when necessary to communicate with a particular data or output source. The elements connected to the data structure 90 need not actually be separate from the data structure 90. They are depicted as connected in this example database, but some or all may be included within the data structure 90 itself, thus eliminating the need for such a buffer for that input or output source.

Data pertaining to a new property sale is provided as a new data source 114. The new data source in the preferred embodiment is a continually updated source of real estate new sales data. It need not necessarily be one source. The new data source 114 may be representative of many sources of sales data. In the preferred embodiment, the reference data derived from the new data source 114 is an actual sale of a property. In alternative embodiments, reference data from the new data source 114 may be derived by using appraisals or from other automated valuation model valuations. The price data and valuation database 116 is also connected to the data structure 90 through the input and output connectors 110. This is the database wherein all the new sale prices and each AVM valuation for a subject property are stored. In the preferred embodiment, this price data is derived from new sales, but as stated above, this data may also be from appraisals or from AVM valuations. This price data and valuation database 116 is depicted as a single database. In alternative embodiments, it may be multiple databases, one for each automated valuation model being tested and one for new sale data. Alternative categorization into multiple databases is possible in alternative embodiments of this invention.

The additional input and output resources 118 are also connected to the data structure 90 of this invention using the input and output connectors. This element is representative of any additional input or output necessary or useful in the functioning of the real time testing data structure 90. These additional input and output resources may include a monitor, a keyboard, a mouse, a network connection, a modem connection, a form of wireless connection, a direct connection to another computer or network, an Internet connection for web access to a particular database or user interface, or a connection to other databases or data sources. These are only examples of potential input and output resources. Many others are potentially possible and useful, though they are not depicted here.

The AVM accuracy database 120 is also connected to the data structure 90 using the input and output connectors. This database need not necessarily be separate from the data structure 90, but is depicted herein as being separate. This database stores the automated valuation model rankings, which in the preferred embodiment are updated in real time, of each automated valuation model being tested. This database is represented as being a single entity. It may also be divided and subdivided into accuracy databases for particular geographic areas, economic tiers, and property types. Individual AVM accuracy databases 120 may be created for any identifiable grouping of properties for which data is available.

The automated valuation model connector 112 is used to connect the data structure 90 implementation of this invention with the multiple automated valuation models being tested. It performs a function similar to that of the input and output connectors, specifically designed with multiple automated valuation model valuation requests and responses in mind. In the preferred embodiment, the transactions between an automated valuation model and the invention, such as AVM X valuation request 128 and AVM X valuation response 130, are performed using extended markup language (XML). Often used in communications between different software programs or data structures, this language is used by the automated valuation model connector 112 to format the valuation request for each automated valuation model being tested. This XML request is then sent to the particular automated valuation model being tested, the AVM then provides its response 130 in XML to the automated valuation model connector 112 which then translates it back into a form readable by the rest of the automated valuation model testing data structure 90. Example automated valuation models AVM X 122, AVM Y 124, and AVM Z 126 are depicted as connected to the automated valuation model connector. Each of these AVMs may have a different format in which it expects automated valuation requests and responses to be forwarded and returned. The automated valuation model connector 112 is designed to handle and format requests and responses for each of these AVMs. These three connected AVMs are only examples. Additional AVMs may be connected. In the preferred embodiment, all available AVMs are connected to enable the real time testing method to provide the most complete data and accuracy rankings for AVMs.

Figure 2:
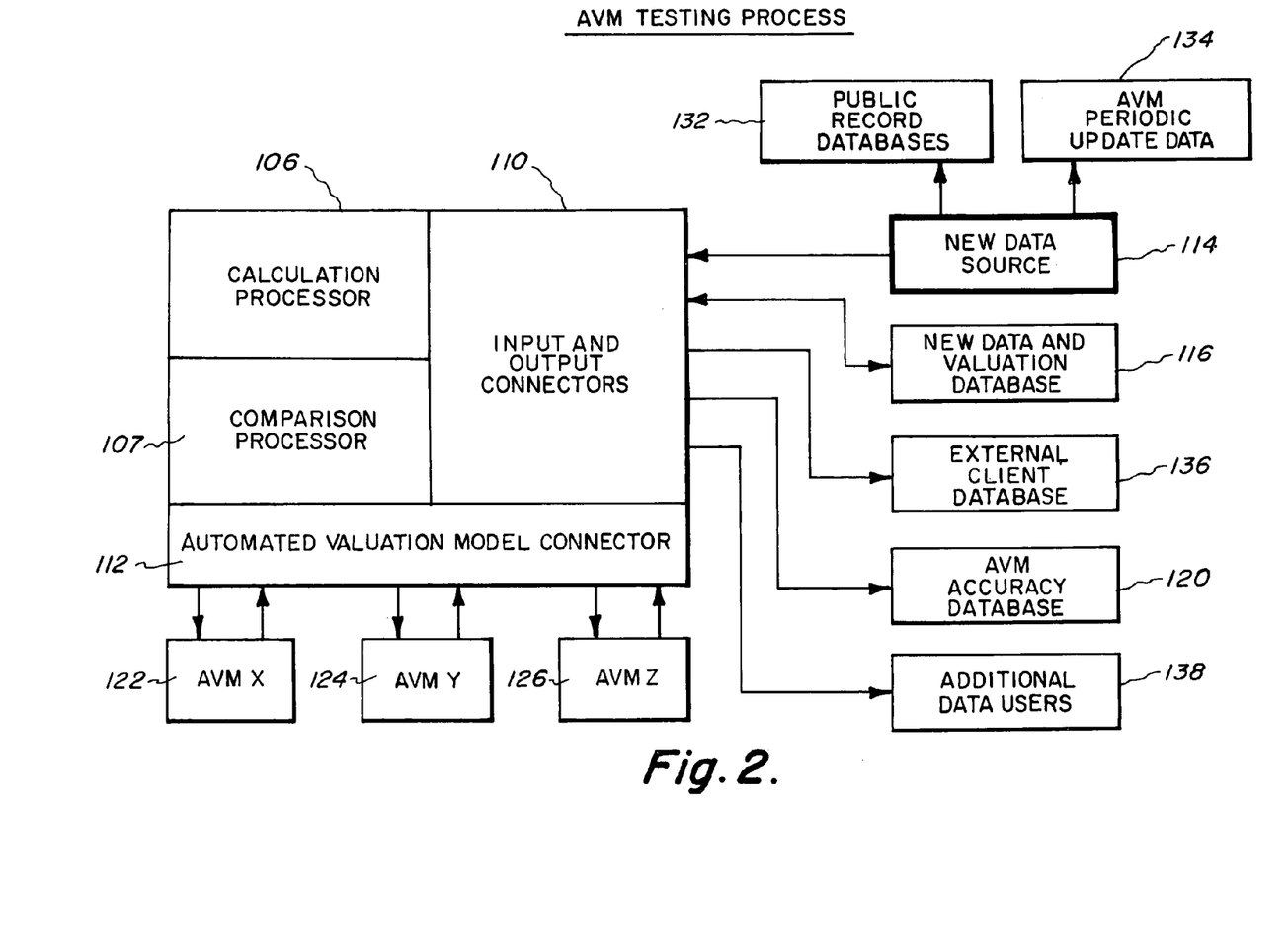
FIG. 2 is a more detailed depiction of specific portions of the data structure depicted in FIG. 1 along with external components used in the method of this invention.

Referring now to FIG. 2, specific portions of the data structure along with external elements are depicted. This depiction contains several of the elements depicted in FIG. 1, but includes the more direct ways in which the components of this method are related. The first step in the method of this invention is to obtain new data or a reference value generated from a new data source 114. As stated above, this is generally a new sale of a property, but may in alternative embodiments be an appraisal or even a particular automated valuation model valuation (for use in comparing other AVMs to the one used as the new sale data). The new data is inputted through the input and output connectors 110 into the new data and valuation database 116. The second step involves requesting and receiving automated valuations from each of the automated valuation models being tested for each reference value. This request may occur immediately subsequent to the reception of new automated valuation model data or at some time shortly thereafter. In the preferred embodiment, this occurs within one day to one week from the receipt of new sale or reference data. In this figure, example AVMs X 122, Y 124 and Z 126 are depicted. Once the new data and the AVM valuations are received through the automated valuation model connector 112, they are sent through the input and output connectors 110 and stored in the new data and valuation database 116. The aggregate data is then used periodically or on command by a user by the calculation processor to calculate various indicators of accuracy for each AVM and to rank each AVM by the various indicators, to weight them according to weighting factors or a weighting equation, and then rank the automated valuation models accordingly.

The various indicators of accuracy are calculated as percentages. These indicators are: absolute mean error, absolute median variance to the reference value (usually the new sale price), mean squared error, automated valuation model accuracy (defined as the percentage of valuations within a predetermined percentage of the reference value, such as 10% of the reference value), the percentage incidence of outlier values (defined as valuations that are beyond a predetermined percentage of the reference value, such as 25% more or less than the reference value), and hit rate percentage (defined as percentage of properties for which the AVM was able to return an evaluation).

These indicators of accuracy are calculated periodically or on command by a user based upon the aggregate data collected over time using the above process of requesting a valuation for a property for which new sale data or a reference value has been generated. Over time, this will provide an increasingly more accurate picture of a particular automated valuation model's accuracy overall and in a particular geographic area, economic tier, or property type. Additionally, these indicators of accuracy may be calculated for particular time frames, for example, if some improvements have been made recently to a particular automated valuation model, then the indicators of accuracy and subsequent rankings dependant upon them may be calculated for the time since the improvements were made.

In the embodiment using weighting factors for each of the indicators of accuracy, the weighting associated with each of these factors is also important. In this embodiment, the weighting factors are as follows:

hit rate is multiplied by 0.05 or 5%
median error is multiplied by 0.1 or 10%
absolute mean error is multiplied by 0.1 or 10%
mean error squared is multiplied by 0.1 or 10%
automated valuation model accuracy is multiplied by 0.35 or 35%
outlier percentage is multiplied by 0.30 or 30%

Hit Rate Percentage

Hit rate percentage (h) is calculated using the following equation: h=n"/n

Where n" is the number of properties for which a valuation was returned and n is the total number of properties.

Median Error

The individual property errors, used in calculating the median error to the reference values are calculated using the equation:

$$error=|s_n-r_n|/s_n \text{ for every sale price}(s) \text{ and reference value}(r).$$

Where
$s_n$ is the sale price or new data price for property n,
$r_n$ is the reference value price for property n, and
n is the number of properties used in the calculation.

These errors are then ordered in ascending order such that the lowest is $i_1$ and the highest is $i_n$.

Then, the median error to the reference value (m) is calculated using the equation:

$$m=i_{n/2}$$

Where n is the number of properties used and i is the list of those errors listed in ascending order by absolute value.

Absolute Mean Error

The absolute mean error (a) is calculated using the equation:

$$a=\Sigma(|s_n-r_n|/s_n)/n$$

Where
$s_n$ is the sale price or new data price for property n,
$r_n$ is the reference value price for property n, and
n is the number of properties used in the calculation.

The summation in the previous equation is calculated from 1 to n, where 1 is the first subject property and n is the last.

Mean Squared Error

The mean squared error (s) is calculated using the equation:

$$s=\Sigma[(s_n-r_n)^2/s_n]/n$$

Where $s_n$ is the sale price or new data price for property n, where $r_n$ is the reference value price for property n, and where n is the number of properties used in the calculation.

Automated Valuation Model Accuracy

Automated valuation model accuracy (c) is calculated using the equation:

$$c=n'/n$$

Where n' is the number of properties whose valuation was within a predetermined percentage of the reference value, such as 10% of the reference value, and where n is the total number of properties. This percentage may be greater or smaller without affecting the method of this invention.

Percentage Incidence of Outlier Values

Percentage incidence of outlier values (o) is calculated using the following equation:

$$o=o'/n$$

Where o' is the number of properties whose valuation was 25% more or less than the reference value and n is the total number of properties. The percentage that is considered to be an outlier value may be greater or smaller without affecting the method of this invention.

Each of the above calculations results in a decimal number that is representative of a percentage value. Depending on the indicator of accuracy a large percentage may indicate accuracy or may indicate inaccuracy. A large percentage, for example in hit rate percentage, indicates accuracy. In one embodiment, the highest hit rate percentage is ranked number one in a particular geographic area, economic tier, or property type. In other indicators of accuracy, for example absolute mean error, a lower percentage indicates more accuracy, stating that the average percentage of value that this particular automated valuation model "misses" the target. For this indicator and in this embodiment, the lowest percentage is ranked highest. In each of the categories, each automated valuation model is ordinally ranked as compared with every other automated valuation model. In this embodiment, these rankings are then multiplied, for each of the automated valuation models in each geographic area, economic tier, or property type, by the associated weighting factor. Each of these multiplied values are added together and multiplied by a scaling factor, such as ten, which results in an "accuracy score." The lowest accuracy score in a particular geographic area, economic tier or property type is the most accurate automated valuation model.

Additionally, once the automated valuation models have been ranked, according the above process, a secondary ranking may take place. During this ranking, the same reference values, usually sale prices, but sometimes alternative new price data, are considered. The computation of rankings is performed using data for which the primary ranked AVM did not return an evaluation. For example, the hit rate is calculated for the primary ranking using all reference values and automated valuation model valuations for each subject property. The secondary hit rate is calculated using only reference values and automated valuation model valuations for subject properties for which the primary automated valuation model did not return a valuation. Similarly, the absolute mean error would only be calculated for properties for which there was no valuation returned by the primary ranked automated valuation model in that geographic area, economic tier, or property type. The purpose of this secondary ranking is to help enable automated valuation model users to determine which automated valuation model to use second, if the primary ranked automated valuation model is unable to value a particular subject property.

In the next step, any external client databases 136 are updated. This connection is made through the input and output connectors 110. The external client database 136 is a database of a client to which the new rankings and accuracy indicators and weights are sent. Additionally, the new data generated by the calculation processor 106 and the comparison processor 107 is sent through the input and output connectors 110 and appended to the AVM accuracy database 120. Alternatively, the rankings, reference values and automated valuations may be added to a new AVM accuracy database 120 for only a particular time period, such as a three-month period. In either database update, the database 120 is updated to reflect changes in the rankings of automated valuation models and the numerical changes to the various indicators of accuracy. Additional data users 138 may also be updated through the input and output connectors 110. These may include the users of the raw data, such as the indicators of accuracy or simply raw data from the new data and valuation database 116 to be used to perform their own calculations. Finally, the new data source 114 will likely be used by relevant public agencies to update public record databases 132. Additionally, various automated valuation model venders periodically use this new data, generally on a monthly or quarterly basis, to update the databases of each of the automated valuation models 134.

Figure 3:
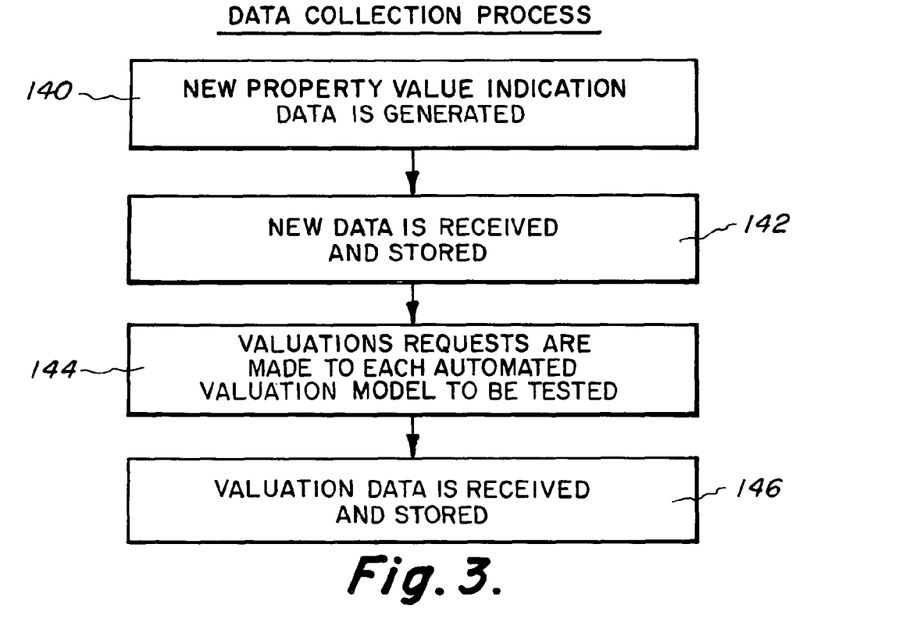
FIG. 3 is a flowchart depicting the steps involved in the data collection process for each property.

FIG. 3, depicts the steps involved in the data collection process of the present invention. The first step in this process is to gather or generate new property value indication data 140. This entails the reception of new sale data from publicly available records. In the preferred method of this invention, the data is appended to the database as quickly as it is received. Next, this new data is received and stored 142 in the new data and valuation database 116. Next, valuation requests are made to each automated valuation model to be tested 144. This request need not occur immediately after receipt of new sale data. In the preferred embodiment of the invention, the new sale data is aggregated and all automated valuations are requested at the end of a day. In alternative embodiments, the requests 144 are made immediately upon receipt of new sale data or at any other predetermined time interval such as bi-daily or weekly. Using either embodiment, the database which stores the automated valuation model valuations and the actual sale price or other reference data is continuously updated and becomes increasingly useful for deriving measures of the accuracy of each automated valuation model.

In the preferred embodiment, the valuation data provided by each automated valuation model is done without reference to the very recent sale. New sale data is gathered using this method for both the purpose of testing automated valuation models but also to provide that new sale data to automated valuation models. Most automated valuation model databases are only updated monthly or quarterly with the data provided using the aggregate new sale data gathered using this method. Therefore, each automated valuation model will most likely provide an automated valuation for the new sale data subject property without reference to the most recent sale price because it has not yet been provided. Even if a particular automated valuation model is updated on a weekly or even a daily basis, the present invention preferably provides accuracy testing of the automated valuation models prior to providing data of the most recent property sales for updates to automated valuation models. This enables the method of this invention to most effectively gauge the accuracy of each automated valuation model being tested. Once each request is made and each automated valuation model responds with its valuation, this data is received and stored 146 into the same database as the new data. Alternatively, this data may be stored in a separate database from that of the new data or in individual databases for each automated valuation model being tested.

Figure 4:
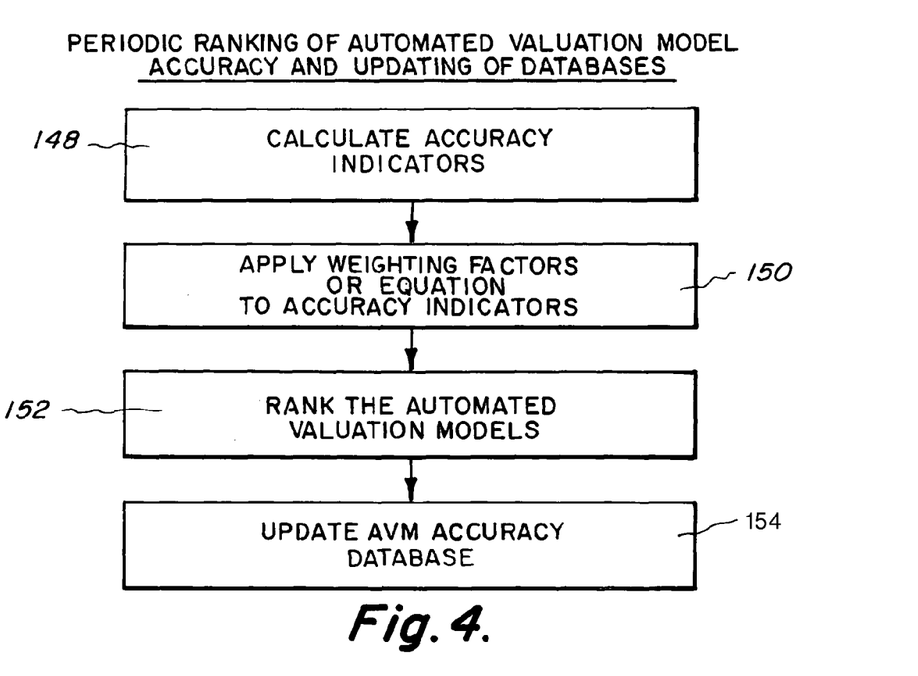
FIG. 4 is a flowchart depicting the steps involved in the periodic ranking of automated valuation model accuracy and updating of databases.

Referring now to FIG. 4, a flowchart depicting the steps involved in the periodic ranking and AVM accuracy database update are depicted. The first step is to calculate the accuracy indicators 148. This takes place in the preferred embodiment in the calculation processor 106. Each of the indicators of accuracy are calculated for each automated valuation model. This is done using the aggregate reference values and automated valuations for each subject property over a set period of time. This time period may be over the life of a particular automated valuation model or for using all data that the method of this invention has been able to store. Alternatively, these indicators of accuracy may be calculated for only a smaller subset of all of the data available because of the method of this invention. Each of the indicators of accuracy is a percentage or an average percentage of a plurality of valuations that may be used to show, in general, the accuracy of each of the tested automated valuation models.

Next, in one embodiment, each AVM is ranked in each indicator of accuracy and in each category-geographic area, economic tier, or property type-by ordinal numbers, then the ordinal number for each AVM's ranking is multiplied by its corresponding weighting factor, and the products of these multiplications are summed 150. The corresponding sum of the products is then used to rank the automated valuation models 152 in the embodiments described. In the embodiment that uses ordinal rankings multiplied by weighting factors, the lowest summed number is the most accurate automated valuation model, and the next lowest summed number is the next most accurate.

In the alternative embodiment that uses a weighting equation, an overall accuracy indicating score is created using an additional formula, rather than ranking each automated valuation model compared to another. In this embodiment, each of the accuracy indicators is calculated in much the same way, but they are weighted using a formula or equation. In the alternative embodiment, the highest calculated number is the most accurate automated valuation model, and the next highest calculated number is the next most accurate. The automated valuation models are then ranked according to which has the highest accuracy score. This alternative embodiment will be described further in discussing FIGS. 7*a*-8*b*.

Figure 5A:
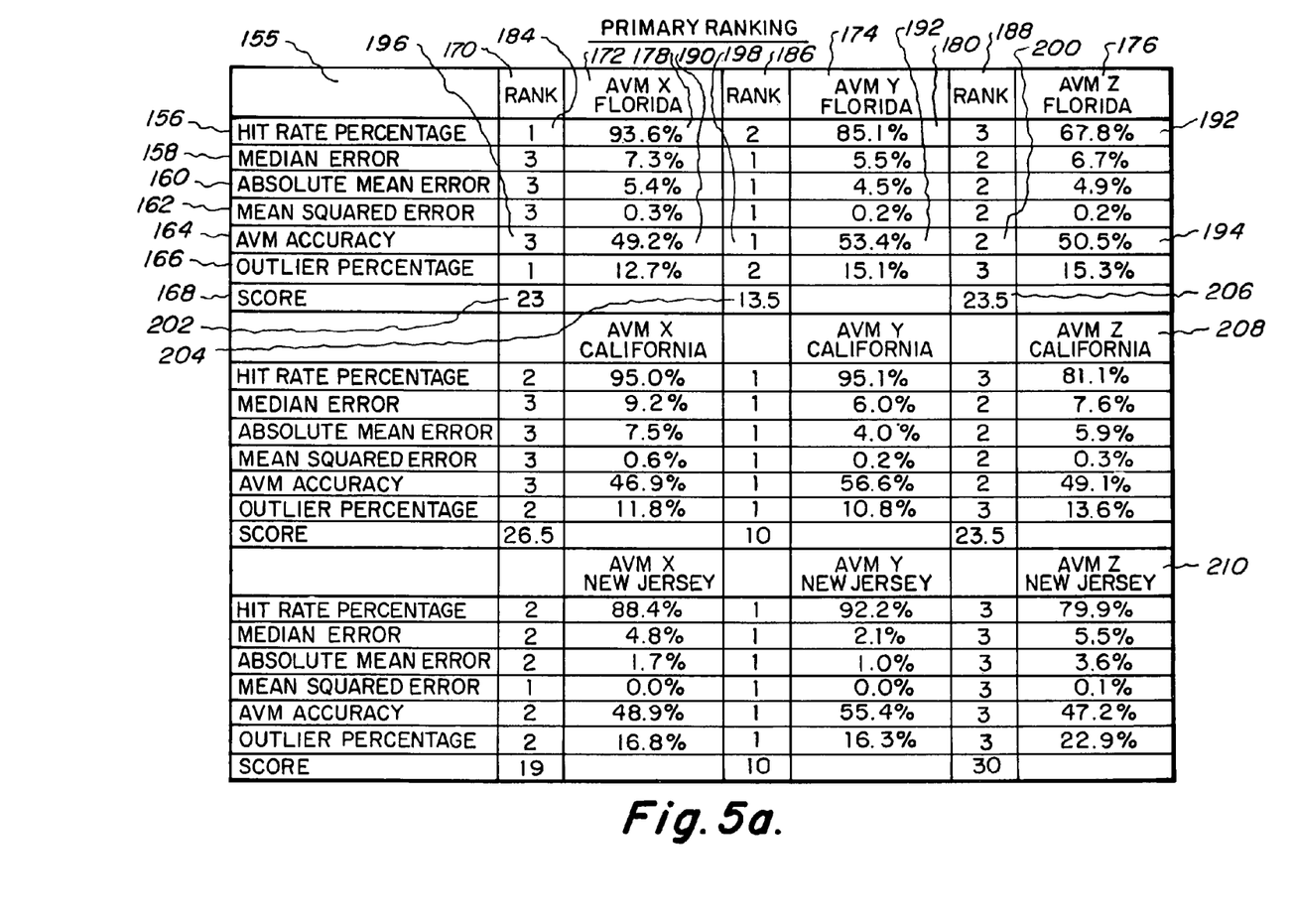
FIG. 5a is a table depicting an example of a primary ranking of several automated valuation models using a predetermined criterion.

Finally, in the embodiments described, once the rankings are calculated, the method of this invention updates the AVM accuracy database 154. This database then contains the most up to-date rankings and the indicators that led to those rankings. Referring now to FIG. 5*a*, the contents of a primary ranking database are depicted. The various indicators of accuracy are depicted in column 155. These are hit rate percentage 156, median error 158, absolute mean error 160, mean squared error 162, AVM accuracy 164, and outlier percentage 166. Hit rate percentage 156 refers to the percentage of reference properties for which each automated valuation model was able to return a valuation. Median error 158 refers to the percentage error at the middle range of the ordered "list" of errors with reference to the reference value. Absolute mean error 160 refers to the percentage average of the absolute value of the list of errors in valuation. Mean squared error 162 is the percentage average in relation to the reference value of the squares of the "list" of errors in valuation. AVM accuracy 164 refers to the percentage of automated valuations within plus or minus 10% of the reference value. Outlier percentage 166 refers to the percentage of automated valuations that are more than plus or minus 25% of the reference value.

Also depicted in element 168 in the embodiment shown in FIG. 5*a* is the score or accuracy score of the particular automated valuation model in the particular geographic area. The rank for each evaluated AVM based on factors 156 through 166 for a predetermined geographic area is in column 170. The rankings for three AVMs, X, Y, and Z, are shown in FIG. 5*a* for three states, Florida, California, and New Jersey. A lower ranking number indicates higher accuracy. For example, the rankings for three AVMs for Florida are shown, AVM X 172, AVM Y 174, and AVM Z 176. The various factors are compared and then ranked. For example in element 178, the hit rate percentage of AVM X in Florida is 93.6%. For AVM Y in Florida, depicted in element 180, the hit rate percentage is 85.1%. For AVM Z in Florida, the percentage is 67.8%. Because the higher the hit rate, that is the number of properties for which a response was generated by the automated valuation model, the higher the accuracy, a larger percentage for this factor is given a higher rank. Therefore, AVM X is ranked #1 in element 184, AVM Y is ranked #2 in element 186 and AVM Z is ranked #3 in element 188.

Similarly, AVM Accuracy, depicted in element 164, is returned as a percentage. This represents, as stated above, the percentage of values that were within plus or minus 10% of the actual price or other reference value. The percentage for AVM X of accuracy was 49.2%, depicted in element 190. The same percentage for AVM Y was 53.4%, depicted in element 192. The same percentage for AVM Z was 50.5%, depicted in element 194. This results in a ranking of #3 for AVM X in element 196, of #1 for AVM Y in element 198 and a ranking of #2 for AVM Z in element 200.

These rankings are then aggregated using a particular weighting applied to each factor. In alternative embodiments, as stated above, different factors may be used. Additionally, alternative weightings may be used in order to improve the usefulness of the rankings or to provide different types of results. Specific alternative embodiments may be implemented to provide a particular type of result. In the first embodiment, the weighting factors are as follows:

hit rate is multiplied by 0.05 or 5%
median error is multiplied by 0.1 or 10%
absolute mean error is multiplied by 0.1 or 10%
mean error squared is multiplied by 0.1 or 10%
automated valuation model accuracy is multiplied by 0.35 or 35%
outlier percentage is multiplied by 0.30 or 30%

The results of these multiplications are then added together and that sum is multiplied by a scaling factor such as ten to arrive at an accuracy score or score as depicted in element 168.

For example, the scaled result for AVM X in Florida, with the weighting factors multiplied by their corresponding rankings, is computed as follows:

$$Score=10*((0.05*1)+(0.10*3)+(0.10*3)+(0.10\ 3)+(0.35*3)+(0.30*1))$$

which equals $$10*(0.05+0.30+0.30+0.30+1.05+0.30)$$

which equals 23 which is the reported score in element 202.

Using the same computation procedure, the score for AVM Y in Florida is 13.5, as depicted in element 204. Similarly, the score for AVM Z in Florida is 23.5, as depicted in element 206.

The same factors, weightings and scores are calculated for each geographic area, economic tier, or property type. Other states, such as California or New Jersey are depicted in elements 208 and 210 respectively. The rankings and calculated percentages for both states are also depicted in the remainder of this table. The contents of this table may be all or part of the content delivered to third party requesters. However, the database of properties valuations and reference values is maintained, along with the data depicted here in this embodiment. The embodiments described update the database quarterly or monthly. Many other automated valuation models may have data stored and ranked accordingly using the method of this invention.

Figure 5B:
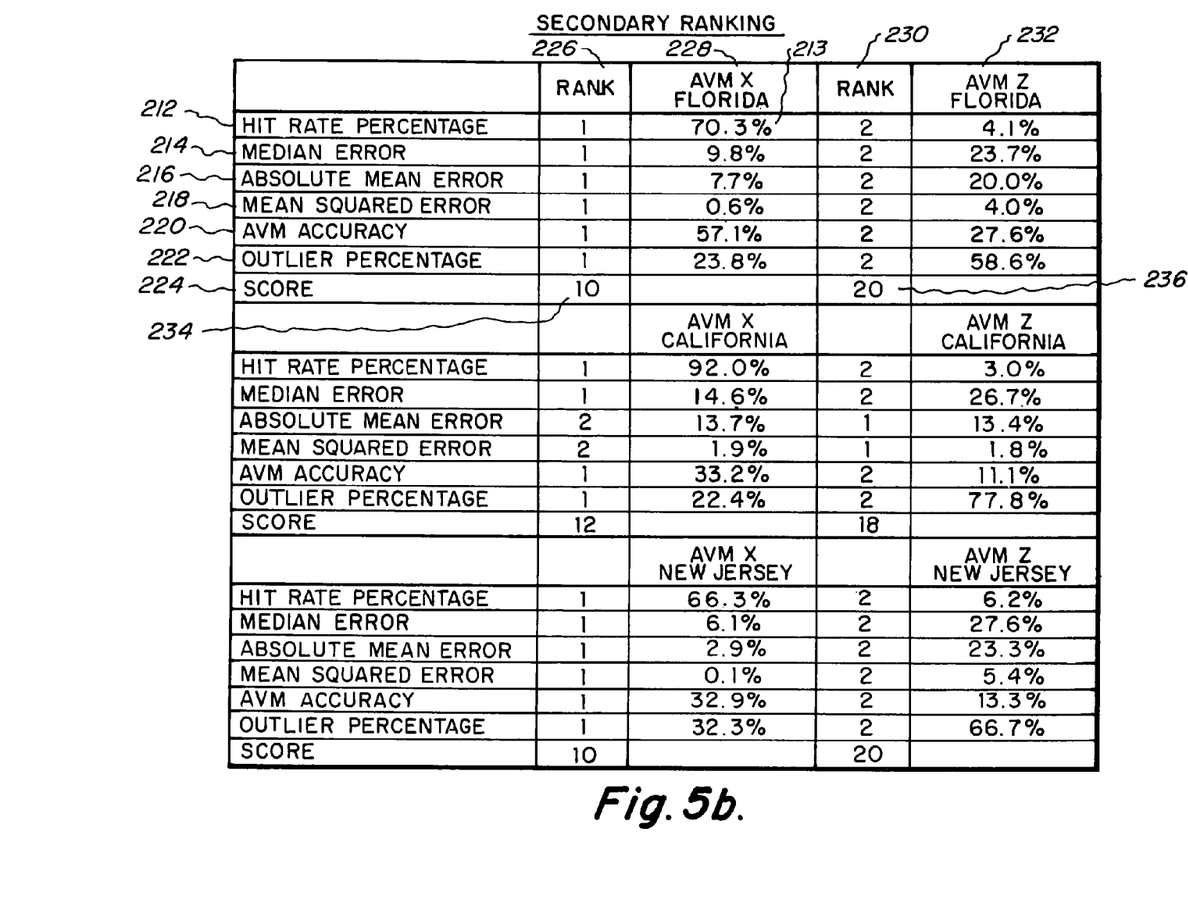
FIG. 5b is a table depicting an example of a secondary ranking of the remaining automated valuation models using the predetermined criterion.

Referring now to FIG. 5b, the contents of an exemplary secondary ranking database are depicted. A secondary ranking provides a ranking of the automated valuation models for properties for which the automated valuation model ranked first in the primary ranking was unable to return a valuation. This ranking is therefore useful in determining which automated valuation model is a good "second choice." This database represents most of the same calculations as those of the primary raking, minus the data that was already calculated using the primary ranked automated valuation model, that is the automated valuation model that ranked number 1 overall in a particular category or geographic area. Similar factors are considered along the left column. These are hit rate percentage 212, median error 214, absolute mean error 216, mean squared error 218, AVM accuracy 220 and outlier percentage 222. This secondary ranking is used to determine which automated valuation model to use after the primary ranked model. There is an importance in providing any valuation after the primary ranked automated valuation model was unable to provide one. The hit rate percentage of 70.3% is depicted, as shown in element 213. Also depicted is the score 224. Along the top, the rank 226 or 230, the automated valuation model being tested, such as AVM X—Florida 228 or AVM Z—Florida 232 are depicted. In the first embodiment, as indicated above, the weighting factors are as follows:

hit rate is multiplied by 0.05 or 5%
median error is multiplied by 0.1 or 10%
absolute mean error is multiplied by 0.1 or 10%
mean error squared is multiplied by 0.1 or 10%.
automated valuation model accuracy is multiplied by 0.35 or 35%
outlier percentage is multiplied by 0.30 or 30%

The results of these multiplications are then added together and that sum is multiplied by a scaling factor such as ten to arrive at an accuracy score or score as depicted in element 224.

For example, the scaled result for AVM X in Florida, with the weighting factors multiplied by their corresponding rankings, is computed as follows:

$$Score=10*((0.05*1)+(0.10*1)+(0.10*1)+(0.10*1)+(0.35\ 1)+(0.30*1))$$

which equals $$10*(0.05+0.10+0.10+0.10+0.35+0.30)$$

which equals 10 which is the reported score in element 234.

Using the same computation procedure, the secondary ranking score for AVM Z in Florida is 20, as depicted in element 236.

Figure 6A:
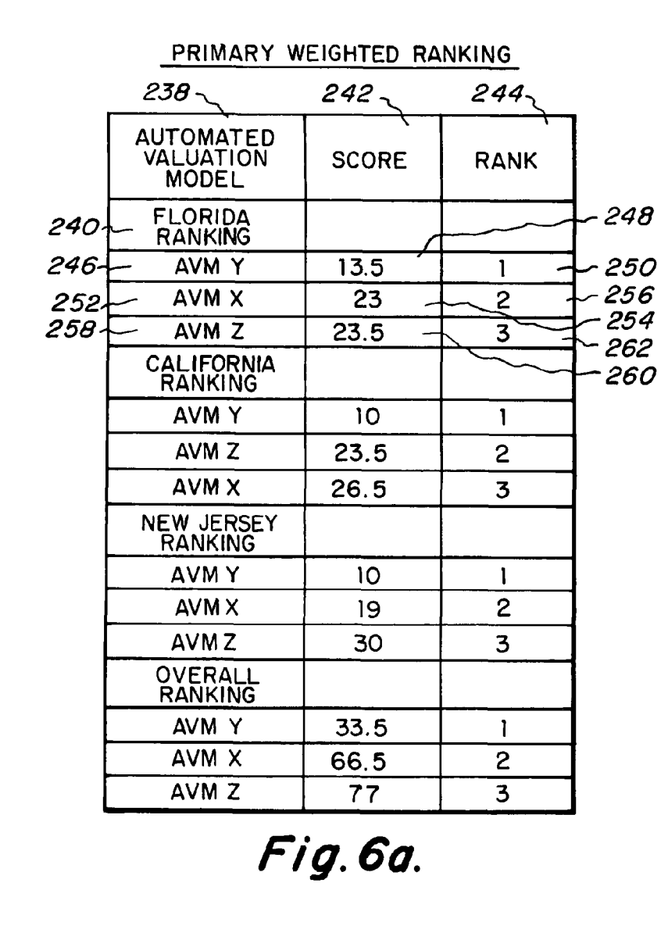

Referring now to FIG. 6a, a summary of the example primary weighted ranking is depicted. This is a summary form of the results tabulated in FIG. 5a. In the left column, each automated valuation model 238 is depicted. The Florida ranking 240 is shown at the top. The score 242, from FIG. 5a and rankings, based upon the score from FIG. 5a are depicted. The automated valuation model with the lowest score in a particular area is the most accurate in that area, according to one embodiment of this invention. For example, AVM Y 246 with a score of 13.5, depicted in element 248 is ranked #1 in element 250. AVM X 252 with a score of 23, depicted in element 254 is ranked #2 in element 256. AVM Z 258 with a score of 23.5, depicted in element 260 is ranked #3 in element 262. This consolidated table can be used to describe the relative accuracies of each automated valuation model in relation to each other in a particular geographic area (in this case) or other such division of properties. Many other automated valuation models may be included in this table and ranked accordingly.

Figure 6B:
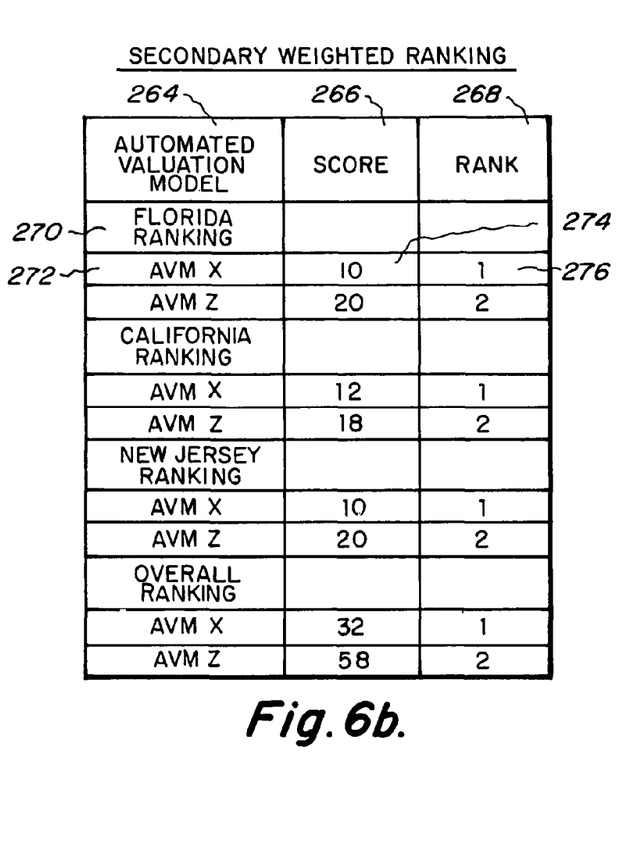
FIG. 6b is a table depicting a summary of the secondary weighted rankings of several automated valuation models using the data obtained from the rankings shown in FIG. 5b.

Referring now to FIG. 6b, an example summary secondary weighted ranking is depicted. This table is similar to the table depicted in FIG. 6a, but is based on the data contained in FIG. 5b. Therefore, this data excludes the valuations that were theoretically done using the primary ranked automated valuation model that is the most accurate one in a particular geographic area. This weighted ranking displays in the tabular form, automated valuation model 264, score 266, and rank 268. The Florida ranking is depicted in element 270. In Florida, AVM X 272 had a secondary score of 10, depicted in element 274 and a ranking of #1, depicted in element 276. All of the remaining automated valuation models are ranked in this secondary ranking.

Figure 7A:
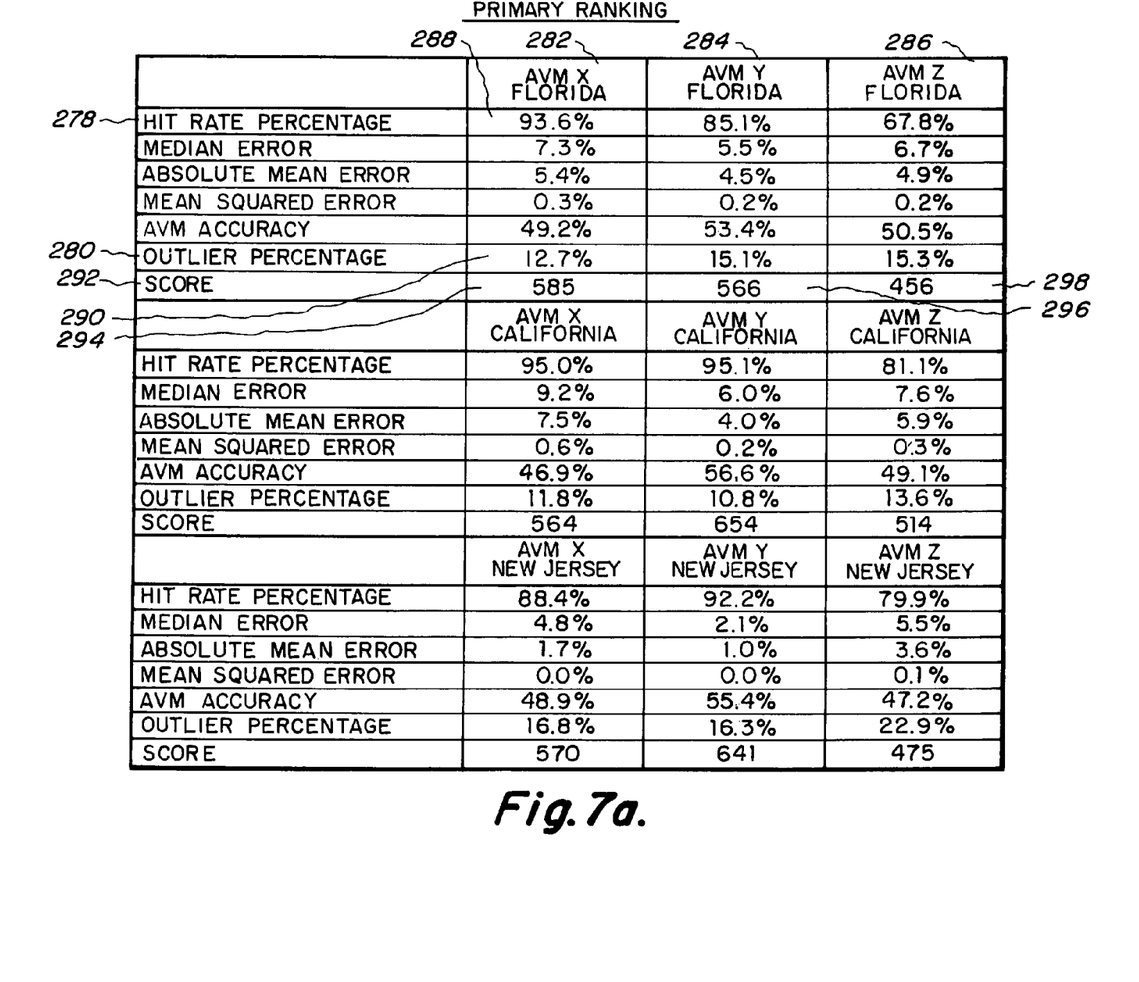
FIG. 7a is a table depicting an example alternative embodiment of a primary ranking of several automated valuation models using an alternative predetermined criterion.

Referring now to FIG. 7a, the results of an alternative embodiment of the method used to implement the primary ranking of this invention is depicted. In this embodiment of the present invention, a formula is used to provide the relative weightings of the individual indicators of accuracy. The elements depicted in FIG. 7a are much the same as those depicted in FIG. 5a. The indicators of accuracy hit rate percentage 278 through outlier percentage 280 are the same. The values for hit rate percentage 278 in each automated valuation model are the same as in FIG. 5a. For example, the hit rate percentage for AVM X in Florida is 93.6% as depicted in element 288. Similarly, the outlier percentage, depicted in element 290 is 12.7%. Each of the same automated valuation models are depicted; AVM X in 282, AVM Y in 284 and AVM Z in 286. The formulas used to calculate each of the percentage values are the same. However, an overall accuracy indicating score 292 is created using an additional formula, rather than ranking each automated valuation model's accuracy indicators compared to another. The following is the score computation equation where each percentage is represented as a decimal:

$$Score = f*((h+c)-(m+a+s+o))$$

Where
f=multiplier factor, in the preferred embodiment it is 500
h=hit rate percentage
c=automated valuation model accuracy
m=median error to the reference value
a=absolute mean error s=mean squared error
o=percentage incidence of outlier values Using this formula, along with the data in element 288 through element 290, the score in element 294 is calculated. The equation, with the numbers in place of the variables would appear as follows:

$$Score = 500*((0.936+0.492)-(0.073+0.054+0.003+0.127))$$

which equals $$500*(1.428-0.257)$$

which equals
585 which is the reported score in element 294.

This equation is used to calculate each of the scores for the automated valuation models in each geographic area, economic tier or property type. A multiplier factor of 500 is used in the invention to accentuate the differences in accuracy between the automated valuation model valuations. A higher score represents a more accurate automated valuation in a particular geographic area, economic tier or property type. In Florida, for example AVM X is the most accurate with a score of 585, depicted in element 294. AVM Y is the next-most accurate with a score of 566, depicted in element 296 and AVM Z is the least accurate with a score of 455, depicted in element 298.

Figure 7B:
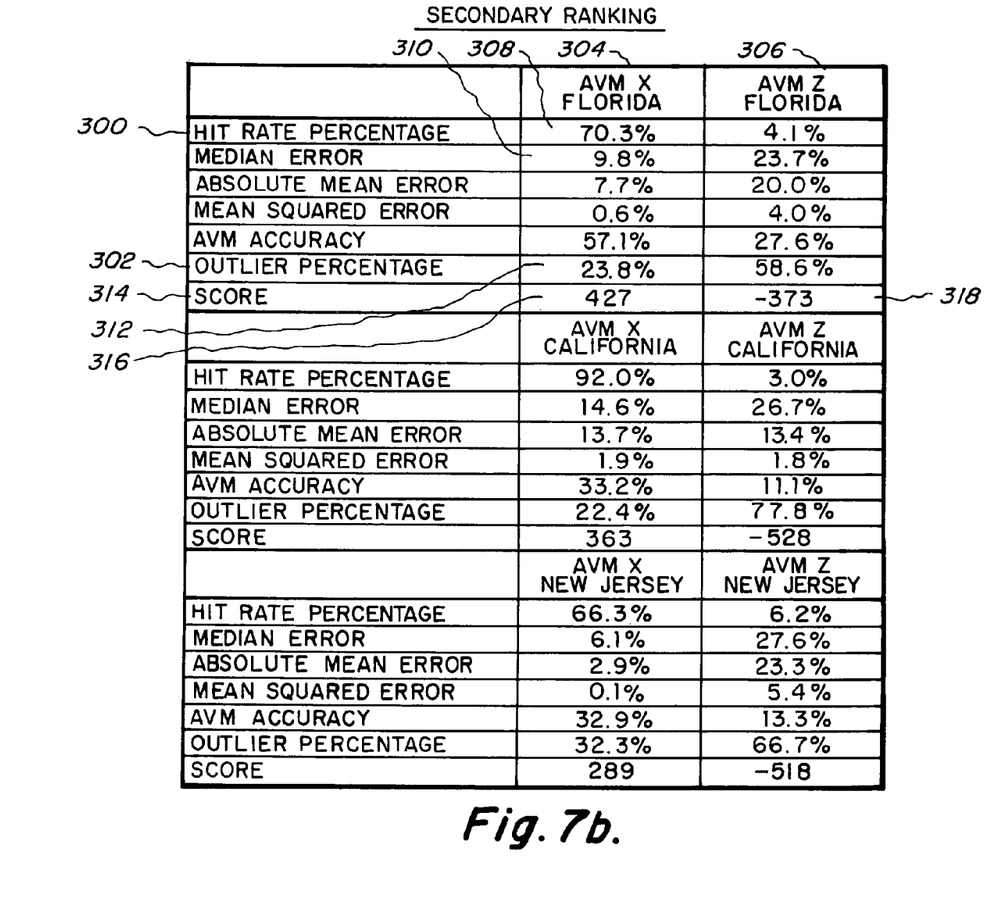
FIG. 7b is a table depicting an example alternative embodiment of a secondary ranking of the remaining automated valuation models using the predetermined criterion.

Referring now, to FIG. 7b, the results of an alternative embodiment of the method used to implement the secondary ranking of this invention is depicted. As stated above, the secondary ranking is useful in finding a "second choice" automated valuation model. The valuations performed by the first-ranked automated valuation model in the primary ranking are removed. In this example, the "overall" primary automated valuation model was removed. This means that because AVM Y was the most accurate overall, it was "chosen" as the primary automated valuation model for each region. In an alternative method, the primary automated valuation model may be chosen for a particular geographic region, economic tier or property type. In that embodiment, for example, in Florida, AVM X would have been the primary automated valuation model because it was more accurate in that geographic area. So, it would be excluded from the secondary ranking.

In this embodiment, only the valuations for which the top ranked primary automated valuation model, AVM Y, did not return a value are considered. In this table many of the same elements depicted in FIG. 5b are shown. Indicators of accuracy from hits 300 to outlier percentage 302 are depicted. Both of the previous non-top-ranked automated valuation models are included, AVM X 304 and AVM Z 306.

As stated above, hit rate percentage is again depicted because for a secondary ranking, the percentage of additional properties for which valuations are returned is important in deciding which automated valuation model to use as a "second choice." In this table, the hit rate percentage for AVM X in Florida was 70.3%, depicted in element 308. In an alternative embodiment of this implementation, the total number of the remaining properties that were able to be valued may be considered.

The same equation used for the primary ranking is used again, excluding the previously valued properties. The equation is as follows:

$$Score = f*((h+c)-(m+a+s+o))$$

Where
f=multiplier factor, in the preferred embodiment it is 500
h=hit rate percentage
c=automated valuation model accuracy
m=median error to the reference value
a=absolute mean error
s=mean squared error
o=percentage incidence of outlier values The equation for AVM X in Florida with the numbers in place of the variables would appear as follows:

$$Score = 500*((0.703+0.571)-(0.098+0.077+0.006+0.238))$$

which equals $$500*(1.274-0.419)$$

which equals
427 which is the reported score in element 316.

As stated above, a higher score denotes a higher level of accuracy. The score of AVM Z in Florida, depicted in element 318 is only −373 and it is therefore considerably less accurate than AVM X in Florida in the properties remaining after the top ranked automated valuation model in the primary ranking has valued properties. Both the primary and secondary ranking of automated valuation model accuracy using either of the embodiments provides a means by which automated valuation models may be compared against each other for accuracy that are improvements over the prior art.

Figure 8A:
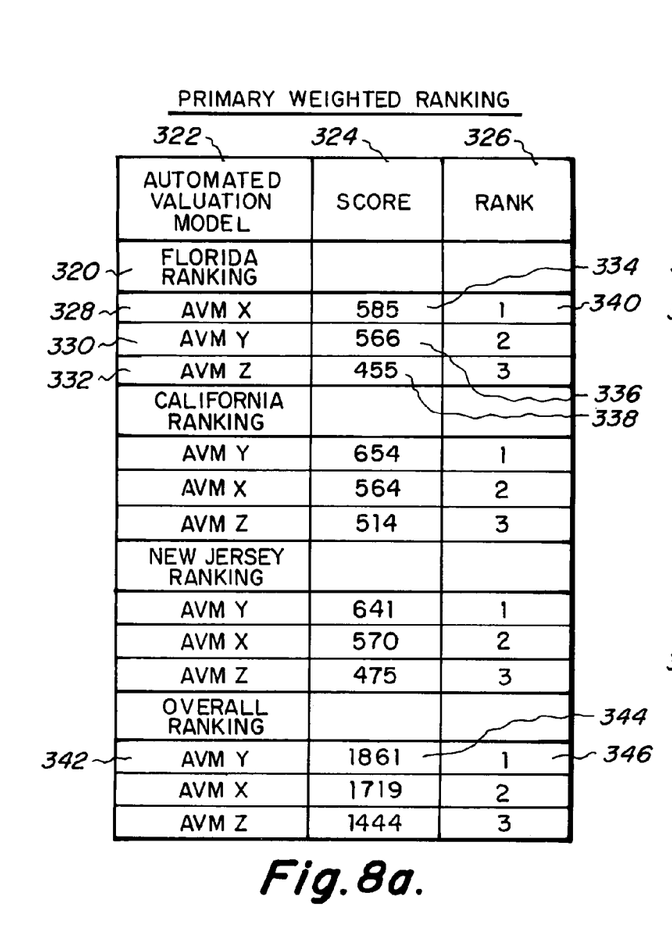

Referring now to FIG. 8a, an example summary primary weighted ranking of the alternative embodiment is depicted. This is a summary form of the data presented in FIG. 7a depicting only the scores in each location and the relative ranking. Similar to FIG. 6a above, the state for which the rankings are being done is depicted as Florida in element 320. The column for automated valuation model 322, includes AVM X 328, AVM Y 330 and AVM Z 332. The respective scores for each of these automated valuation models are 585, depicted in element 334; 566, depicted in element 336; and 455, depicted in element 338. Therefore, AVM X 328 with its score of 585 in Florida is ranked number one, as depicted in element 340. The overall rankings depicted below are a result of the addition of each of the scores in each area. AVM Y 342 with its overall score of 1861, depicted in element 344 is ranked number one 346 overall. In an alternative embodiment, the overall ranking may be determined by dividing the geographic area score by the number of properties in that area for which automated valuations were provided and then adding the numbers together. This would provide a ranking weighted as to the percentage of homes in a particular market or its relative importance in use of automated valuation data.

Figure 8B:
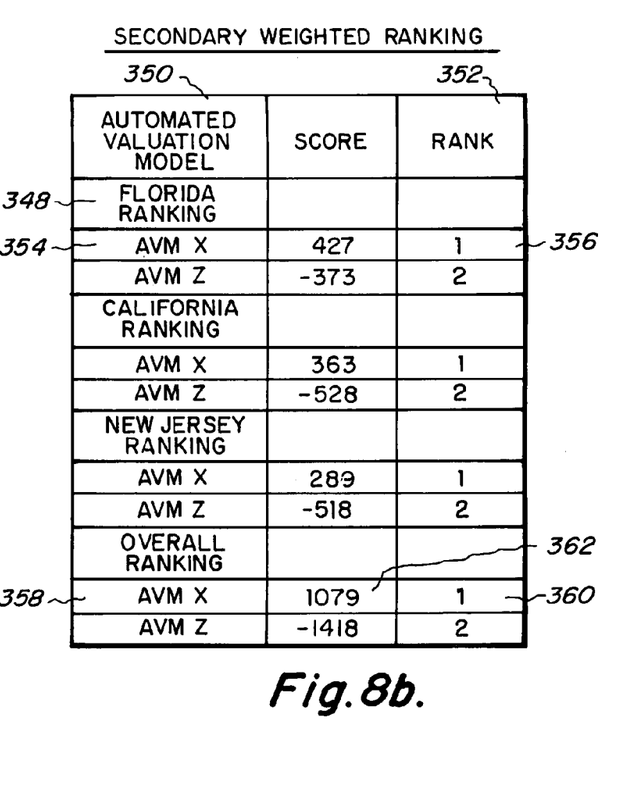
FIG. 8b is a table depicting a summary of the secondary weighted rankings of several automated valuation models using the data obtained from the rankings shown in FIG. 7b.

Referring now to FIG. 8*b*, a secondary weighted ranking is depicted. This is a summary table of the data contained in FIG. 7*b*. This table is useful in comparing directly secondary rankings. As in FIG. 6*b*, the automated valuation model being ranked is depicted in the column denoted by element 350. The Florida secondary ranking, for example, is depicted in element 348. AVM X in Florida, for example, depicted in element 354, received a rank of one, as depicted in element 356. The column depicted in element 352 denotes the rank. Overall, AVM X 358, received the number one ranking 360 with a score of 1079, depicted in element 362.

A method of and apparatus for real time testing of automated valuation models has been described. It is to be understood that the foregoing description has been made with respect to specific embodiments thereof for illustrative purposes only. The overall spirit and scope of the present invention is limited only by the following claims, as defined in the foregoing description.

What is claimed is:

1. A system for determining the accuracy of automated valuation models (AVMs) that provide automated valuations for real estate properties, the system comprising:
   physical data storage configured to store (1) a reference valuation for a subject property and (2) a plurality of automated valuations of the subject property, each automated valuation of the subject property generated by an automated valuation model (AVM) without use of the reference valuation for the subject property, wherein different automated valuations correspond to different AVMs; and
   a computer system in communication with the physical data storage, the computer system comprising computer hardware, the computer system programmed to:
   calculate one or more indicators of accuracy for each AVM, the indicators of accuracy for each AVM based at least in part on the AVM's automated valuation of the subject property and the reference valuation of the subject property, wherein the AVM generates the automated valuation of the subject property before being updated with the reference valuation for the subject property, the reference valuation available to but not used by the AVM for the automated valuation; and
   determine a ranking of the plurality of AVMs based at least in part on the one or more indicators of accuracy.

2. The system of claim 1, wherein the reference valuation for the subject property comprises at least one of: a sale price for the subject property, an appraisal for the subject property, an AVM valuation of the subject property, and a foreclosure value for the subject property.

3. The system of claim 1, wherein at least one of the indicators of accuracy comprises an error value calculated based at least in part on the automated valuation of the subject property by an AVM and the reference valuation of the subject property.

4. The system of claim 3, wherein the error value comprises at least one of: an absolute mean error, a median error, and a mean squared error.

5. The system of claim 1, wherein at least one of the indicators of accuracy is an AVM accuracy indicator based at least in part on the number of automated valuations of the subject property that are within a percentage of the reference valuation for the subject property.

6. The system of claim 1, wherein at least one of the indicators of accuracy is an outlier indicator based at least in part on the number of automated valuations of the subject property that are outside a percentage of the reference valuation for the subject property.

7. The system of claim 1, wherein at least one of the indicators of accuracy is a hit rate indicator based at least in part on the number of real estate properties for which the AVM is able to return an automated valuation.

8. The system of claim 1, wherein the computer system is programmed to:
   determine an accuracy score for each of the plurality of AVMs based at least in part on the one or more indicators of accuracy for each AVM; and
   determine the ranking of the plurality of AVMs based at least in part on the accuracy scores.

9. The system of claim 8, wherein the computer system is programmed to determine the accuracy score by weighting at least some of the indicators of accuracy.

10. The system of claim 1, wherein the computer system is programmed to determine the ranking of the plurality of AVMs based at least in part on costs to request the automated valuations from the plurality of AVMs.

11. The system of claim 1, wherein the computer system is programmed to determine the ranking of the plurality of AVMs in one or more categories for the real estate properties.

12. The system of claim 11, wherein the one or more categories comprise at least one of: an economic tier, a property type, and a geographic area.

13. A system for determining the accuracy of automated valuation models that provide automated valuations for real estate properties, the system comprising:
   physical data storage configured to store reference valuations for real estate properties and automated valuations of the real estate properties; and
   a computer system in communication with the physical data storage, the computer system comprising computer hardware, the computer system programmed to:
   determine first accuracy rankings for a first plurality of automated valuation models (AVMs), the first accuracy rankings based at least in part on the reference valuations for the real estate properties and automated valuations provided by the first plurality of automated valuation models for at least some of the real estate properties;
   determine a primary automated valuation model (primary AVM) based at least in part on the first accuracy rankings;
   determine second accuracy rankings for a second plurality of AVMs, the second plurality of AVMs including at least some of the first plurality of AVMs but not including the primary AVM, the second accuracy rankings based at least in part on the reference valuations of the real estate properties and automated valuations provided by the second plurality of AVMs for real estate properties for which the primary AVM was not able to return an automated valuation; and determine a secondary automated valuation model (secondary AVM) based at least in part on the second accuracy rankings.

14. The system of claim 13, wherein at least one of the automated valuations of a real estate property provided by the first plurality of AVMs or by the second plurality of AVMs is generated without use of the reference valuation of the real estate property.

15. The system of claim 13, wherein the second plurality of AVMs includes the first plurality of AVMs except for the primary AVM.

16. The system of claim 13, wherein the primary AVM and the secondary AVM are determined for at least one of: a geographic area, an economic tier, and a property type for the real estate properties.

17. A system for determining the accuracy of automated valuation models (AVMs) that provide automated valuations for real estate properties, the system comprising:
  physical data storage configured to store at least one indicator of accuracy for each of a plurality of automated valuation models (AVMs), the at least one indicator of accuracy for an AVM based at least in part on (1) a reference valuation for a subject property and (2) a valuation generated by the AVM for the subject property, wherein the valuation is generated without use of the reference valuation for the subject property; and
  a computer system in communication with the physical data storage, the computer system comprising computer hardware, the computer system programmed to:
    determine a ranking of the plurality of AVMs based at least in part on the indicators of accuracy for the AVMs;
    determine a primary AVM based on the ranking of the plurality of AVMs; and
    determine a secondary AVM based at least in part on indicators of accuracy for real estate properties for which the primary AVM was not able to return an automated valuation.

18. The system of claim 17, wherein at least one of the indicators of accuracy comprises an error value calculated based at least in part on the automated valuation of the subject property by an AVM and the reference valuation of the subject property.

19. The system of claim 18, wherein the error value comprises at least one of: an absolute mean error, a median error, and a mean squared error.

20. The system of claim 17, wherein the computer system is programmed to:
    determine an accuracy score for each of the plurality of AVMs based at least in part on the at least one indicator of accuracy for each AVM; and
    determine the ranking of the plurality of AVMs based at least in part on the accuracy scores.

21. The system of claim 20, wherein the computer system is programmed to determine the accuracy score by weighting at least some of the indicators of accuracy.

* * * * *